No. 873,444.

PATENTED DEC. 10, 1907.

E. N. LUBURG.
TROLLEY WHEEL.
APPLICATION FILED SEPT. 18, 1905.

WITNESSES.
Robt. E. Gerhardt
Albert H. Smith

Ellsworth Nelson Luburg
INVENTOR.

BY William Wesley Varney
HIS ATTORNEY.

UNITED STATES PATENT OFFICE.

ELLSWORTH NELSON LUBURG, OF BALTIMORE, MARYLAND, ASSIGNOR OF ONE-THIRD TO WILLIAM WESLEY VARNEY AND ONE-THIRD TO ALBERT HENRY SMITH, OF BALTIMORE, MARYLAND.

TROLLEY-WHEEL.

No. 873,444.

Specification of Letters Patent.

Patented Dec. 10, 1907.

Application filed September 18, 1905. Serial No. 278,832.

*To all whom it may concern:*

Be it known that I, ELLSWORTH NELSON LUBURG, a citizen of the United States, residing at and whose post-office address is corner of Jackson and Taylor streets, Homestead, Baltimore city, in the State of Maryland, have invented a new and useful Trolley-Wheel, of which the following is a specification.

My invention relates to improvements in trolley-wheels such as are used on electric trolley cars; and the object of my improvement are, first, durability in the life of the bearing; second, improved means of lubrication; and third, means of preventing dust and grit from getting into the bearing. I attain these objects by the mechanism illustrated in the accompanying drawing, in which—

Figure 1:
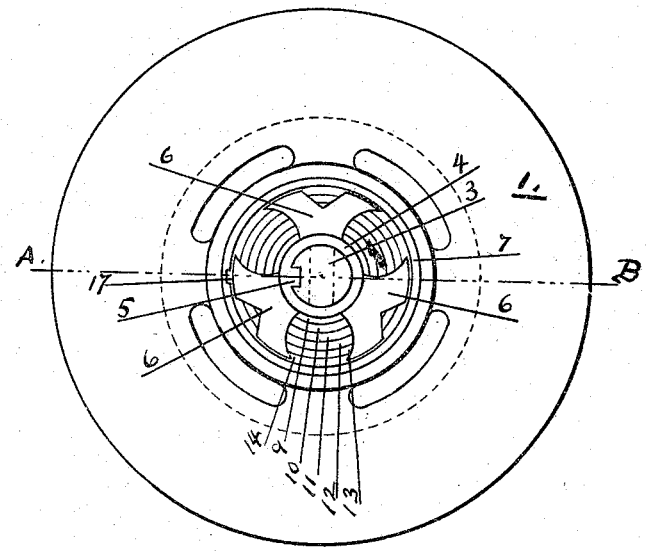
Figure 2:
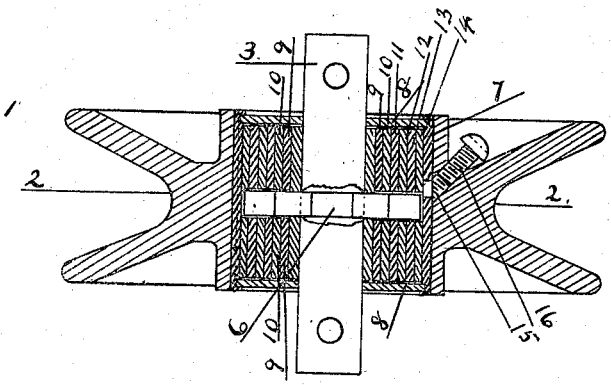

Figure 1 is a view in elevation of my trolley-wheel with the oil cap, and one side of the wearing rings removed; and Fig. 2, is a sectional view of my improvement taken through A B of Fig. 1 before the removal of any of the parts.

Similar numerals refer to similar parts throughout the several views.

1 is the trolley-wheel having groove 2 in which the trolley wire not shown works.

3 is the pin or axle which secures the trolley wheel to the fork of the trolley pole not shown.

4 is a sleeve feathered on to pin 3 by feather and keyway 5. On sleeve 4 are attached arms 6 which are shaped at their extremities for scooping oil from outside casing 7 and bringing it towards the center, said arms sleeve and pin not revolving. Outside casing 7 which may be made integral with and forming a part of the trolley wheel or may be an independent bushing in the same is burred over at the ends to secure oil caps 8 in position and make the same oil tight at its outside circumference. Between sleeve 4 and outside casing 7 and confined between oil caps 8 and arms 6 are a plurality of nesting rings 9, 10, 11, 12, 13 and 14 which form between themselves wearing or bearing surfaces. It is preferable but not essential that the wearing surfaces be of different materials.

15 is an oil hole through trolley wheel 1 and outside casing 7. 16 is a screw or plug for oil hole 15. 17 is a groove in the interior surface of outside casing 7 for the circulation of oil.

The operation of my invention is as follows: Outside casing 7 and oil caps 8 form an oil receptacle which is periodically filled; as the wheel revolves the oil tends to pass outward to groove 17, it is then scraped off and brought back to the center by immovable arms 6 when it enters between the nesting rings and works its way to the periphery again. The nesting rings form a plurality of wearing surfaces, the trolley wearing on one set of nesting rings until they become warm and sticky when they may adhere and a new set of rings come into operation, allowing the first set to cool and become lubricated again, this intermittent process taking place indefinitely, or they may all work simultaneously.

What I claim and desire to secure by Letters Patent is:

1. The combination of a wheel, a bearing in the hub thereof comprising a casing having a longitudinal groove therein, a stationary member operating in said casing having arms for sweeping the lubricant from said casing and conveying it inwardly, and a plurality of concentric wearing rings on each side of said stationary member.

2. The combination of, a wheel forming a casing in the hub thereof, a stationary member operating in said casing and formed to convey lubricant from the inner surface of said casing inwardly and wearing rings at the side of said stationary member.

3. An axle, a member secured to said axle having means for conveying lubricant from a moving surrounding member towards said axle, in combination with a rotating body forming said surrounding member and a plurality of wearing rings in said surrounding member at the side of said member secured to said axle whereby lubricant may be conveyed to the said wearing rings.

4. The combination of a wheel, a casing in the hub thereof, a stationary member operating in said casing and formed to convey lubricant from the inner surface of said casing inwardly, wearing rings at the side of said stationary member, and means for retaining the lubricant in said casing.

5. An axle, a member secured to said axle having means for conveying lubricant from a moving surrounding member towards said axle, in combination with a rotating body forming said surrounding member and a plurality of wearing rings in said surrounding member in communication with said member secured to said axle whereby lubricant may be conveyed to the said wearing rings, means for retaining lubricant in said casing, and means of introducing lubricant through the periphery of said casing.

6. The combination of a wheel forming a casing in the hub thereof, a stationary member operating in said casing and formed to convey lubricant from the inner surface of said casing inwardly, wearing rings at the side of said stationary member, means for retaining lubricant in said casing, and means for introducing lubricant through the periphery of said casing.

ELLSWORTH NELSON LUBURG.

Witnesses:
ROBT. E. GERHARDT,
ALBERT H. SMITH.